United States Patent
Nagata et al.

(10) Patent No.: US 8,376,406 B2
(45) Date of Patent: Feb. 19, 2013

(54) PRETENSIONER MECHANISM

(75) Inventors: Tomonori Nagata, Aichi-ken (JP);
Katsuki Asagiri, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 13/179,257

(22) Filed: Jul. 8, 2011

(65) Prior Publication Data

US 2012/0013111 A1  Jan. 19, 2012

(30) Foreign Application Priority Data

Jul. 14, 2010  (JP) ................................. 2010-160101

(51) Int. Cl.
*B60R 22/36* (2006.01)
*B60R 22/46* (2006.01)

(52) U.S. Cl. .......................... 280/806; 242/374; 297/480

(58) Field of Classification Search .................. 60/632, 60/636; 280/806, 807; 297/474, 475, 477, 297/479, 480; 242/374, 390.8, 390.9
See application file for complete search history.

(56) References Cited

U.S. PATENT DOCUMENTS

| | | | | |
|---|---|---|---|---|
| 5,842,344 A * | 12/1998 | Schmid | ............................. | 60/632 |
| 6,155,512 A * | 12/2000 | Specht et al. | ................. | 242/374 |
| 6,340,176 B1 * | 1/2002 | Webber et al. | ................ | 280/806 |
| 6,343,758 B1 * | 2/2002 | Abe et al. | ...................... | 242/374 |
| 6,435,440 B1 * | 8/2002 | Hori | ............................... | 242/374 |
| 6,575,498 B2 * | 6/2003 | Nagata et al. | ................. | 280/806 |
| 6,698,677 B1 * | 3/2004 | Happ et al. | .................... | 242/374 |
| 7,350,733 B2 * | 4/2008 | Wier | .............................. | 242/374 |
| 7,500,632 B2 * | 3/2009 | Ono et al. | ...................... | 242/374 |

FOREIGN PATENT DOCUMENTS

JP   2008-024102 A   2/2008
JP   2010-018071 A   1/2010

OTHER PUBLICATIONS

"Groove" Definition, The Free Dictionary, available at, http://www.freedictionary.org/?Query=groove (last visited Aug. 24, 2012).*

* cited by examiner

*Primary Examiner* — Joseph Rocca
(74) *Attorney, Agent, or Firm* — Robert Mlotkowski; Safran & Cole P.C.

(57) ABSTRACT

A pretensioner mechanism comprising webbing capable of restraining a vehicle occupant; a cylinder member into which gas is supplied when specific conditions occur; a movement member provided so as to be capable of moving inside the cylinder member, the movement member being formed with a communication hole that communicates a first side and a second side of the movement member; a closure member that is inserted into the communication hole and substantially closes off the communication hole to such an extent that pressure from the gas supplied into the cylinder member causes the movement member to move towards the first side and the restraining force of the webbing on the occupant is increased; and a communication groove formed between the communication hole and the closure member to communicate a first side of the closure member with a second side of the closure member.

3 Claims, 6 Drawing Sheets

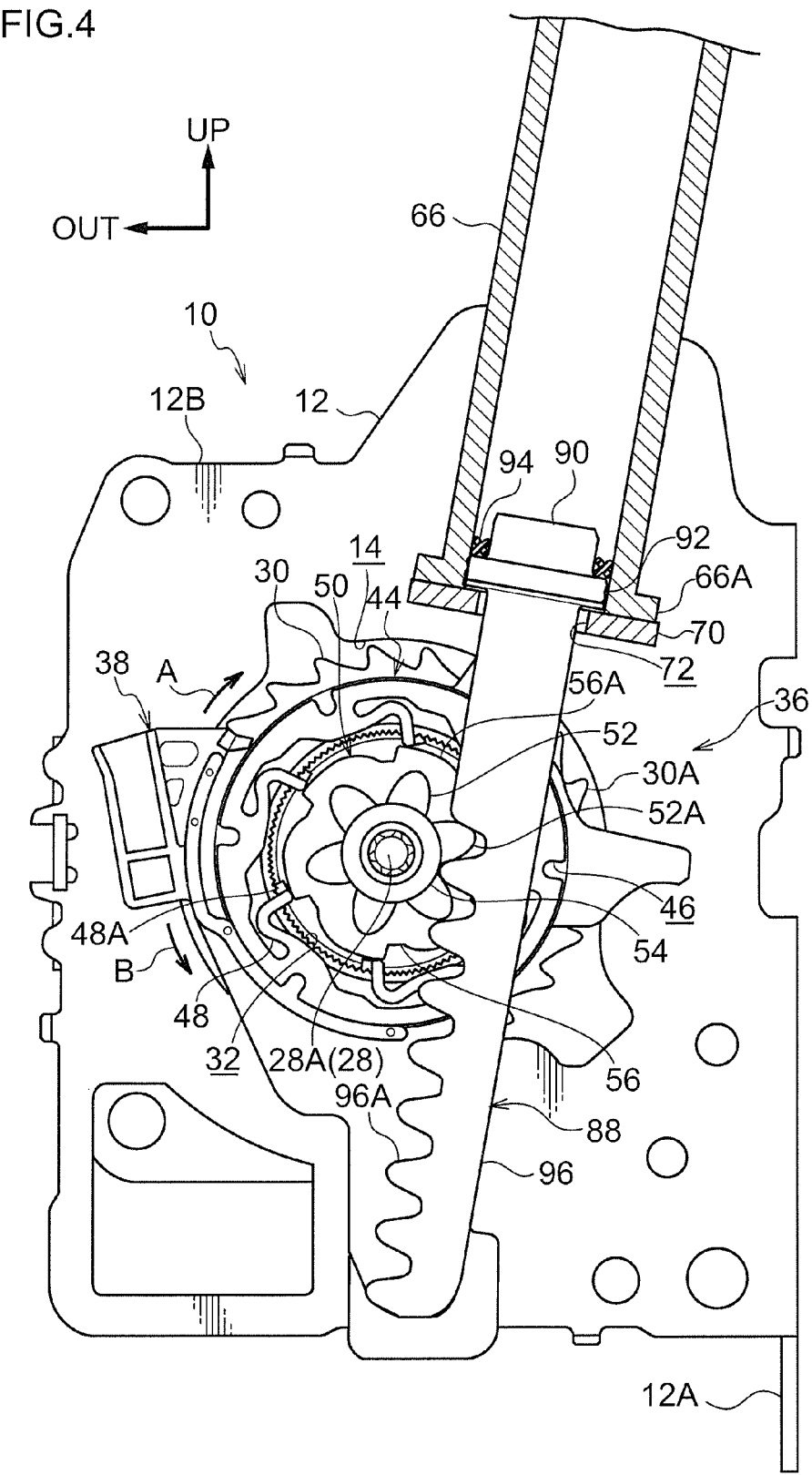

PRETENSIONER MECHANISM

CROSS-REFERENCE TO RELATED APPLICATION

This application claims priority under 35 USC 119 from Japanese Patent Application No. 2010-160101 filed Jul. 14, 2010, the disclosure of which is incorporated by reference herein.

BACKGROUND OF THE INVENTION

1. Technical Field

The present invention relates to a pretensioner mechanism in which a movement member moves by gas pressure supplied into a cylinder member to increase restraining force of webbing on an occupant.

2. Related Art

In pretensioner mechanisms described in Japanese Patent Application Laid-Open (JP-A) Nos. 2010-18071 and 2008-24102, a piston (piton ball) is moved to one side by gas pressure arising from gas supplied into a pipe (pipe cylinder), increasing restraining force of webbing (seatbelt) on an occupant.

In pretensioner mechanism of such a configuration, the pipe and the piston are preferably capable of disassembly from the perspective of recyclability, and disassembly operation is facilitated if the gas in the pipe has been released naturally when the pipe and the piston are taken apart after the piston has been moved to one side by gas pressure.

SUMMARY

The present invention is made in consideration of the above circumstances and provides a pretensioner mechanism with easy operation in a state in which gas has been naturally released from inside a cylinder member when dismantling the cylinder member and a movement member after the movement member has been moved.

The pretensioner mechanism according to a first aspect of the present invention is a pretensioner mechanism including: webbing capable of restraining a vehicle occupant; a cylinder member into which gas is supplied when specific conditions occur; a movement member provided so as to be capable of moving inside the cylinder member, the movement member being formed with a communication hole that communicates a first side and a second side of the movement member; a closure member that is inserted into the communication hole and substantially closes off the communication hole to such an extent that pressure from the gas supplied into the cylinder member causes the movement member to move towards the first side and the restraining force of the webbing on the occupant is increased; and a communication groove formed between the communication hole and the closure member to communicate a first side of the closure member with a second side of the closure member.

A pretensioner mechanism of a second aspect of the present invention is the pretensioner mechanism of the first aspect wherein the communication groove is formed in a helical shape.

A pretensioner mechanism of a third aspect of the present invention is the pretensioner mechanism of the second aspect wherein the closure member may be a set screw.

In the pretensioner mechanism of the first aspect, the communication hole is formed in the movement member such that the communication holes communicates the first side and the second side of the movement member. The closure member is inserted into the communication hole and substantially closes off the communication hole.

The movement member is moved towards the first side by pressure of gas when gas is supplied into the cylinder member under specific conditions, and the restraining force of the webbing on an occupant is increased.

A communication groove is also formed between the communication hole and the closure member such that the communication groove communicates between the first side and the second side of the closure member. Accordingly, when the movement member has moved towards the first side, gas in the cylinder member on the second side of the movement member is exhausted to the first side of the movement member through the communication groove.

Note that, due to the closure member being inserted inside the through hole, the communication groove is formed between the communication hole and the closure member to communicate between the first side and the second side of the closure member, and the surface area of the communication groove is made small.

Consequently, when the movement member is moving towards the first side, the gas in the cylinder member on the second side of the movement member can be suppressed from being released to the first side of the movement member through the communication groove. Any drop in movement force of the movement member towards the first side can hence be suppressed, and the restraining force of the webbing on the occupant can be increased.

Furthermore, after the movement member has moved towards the first side, the gas in the cylinder member on the second side of the movement member can be gently released to the first side through the communication groove. Easy operation when dismantling the cylinder member and the movement member is hence facilitated with the gas inside the cylinder member released without intervention.

In the pretensioner mechanism of the second aspect, the length of the communication groove can be lengthened due to forming the communication groove in a helical shape.

Accordingly, when the movement member is moving towards the first side, the gas inside the cylinder member on the second side of the movement member can be effectively suppressed from being released to the first side of the movement member, enabling any fall in movement force of the movement member towards the first side to be effectively suppressed.

Furthermore, after the movement member has moved to the first side, the gas on the second side of the movement member can be gently released to the first side of the movement member while the gas is gently cooled.

In the pretensioner mechanism of the third aspect, the closure member is formed as a set screw. The whole of the closure member can accordingly be inserted into the communication hole, and, for example, the closure member can be suppressed from completely closing off the communication hole due to the presence of a head.

BRIEF DESCRIPTION OF THE DRAWINGS

FIG. 1A illustrates the pretensioner mechanism during actuation and FIG. 1B illustrates the pretensioner mechanism after actuation;

FIG. 4 is a side view illustrating a pretensioner mechanism after actuation in a webbing take-up device according to the first exemplary embodiment of the present invention, as seen from one side in the vehicle front-rear direction;

FIG. 5A is an exploded perspective view and FIG. 5B is a cross-section; FIG. 6A is a diagram illustrating the pretensioner mechanism during actuation and FIG. 6B is a diagram illustrating the pretensioner mechanism after actuation.

DESCRIPTION

First Exemplary Embodiment

Figure 2:
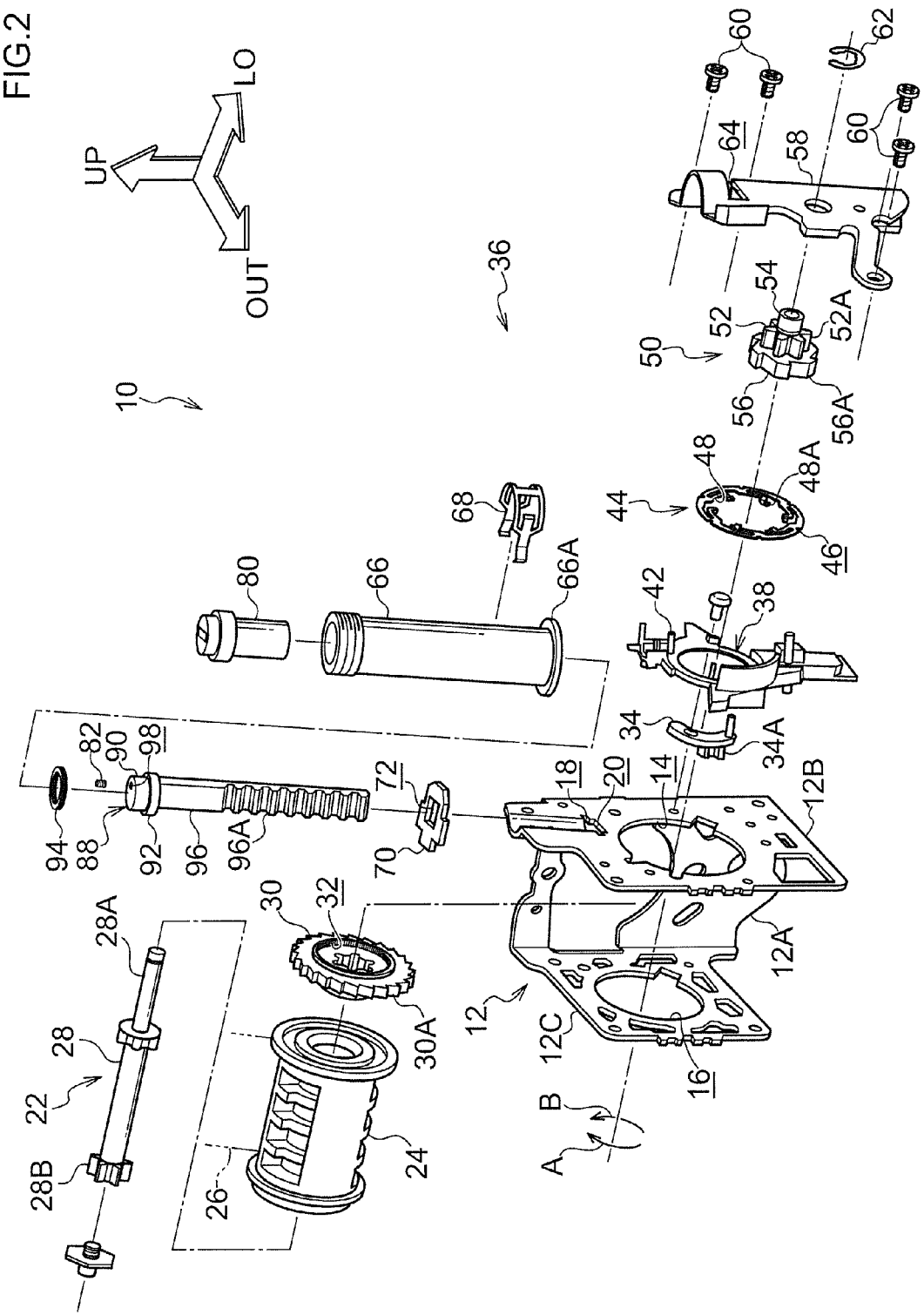
FIG. 2 is an exploded perspective view illustrating a webbing take-up device of a first exemplary embodiment of the present invention, as seen from a vehicle width direction outside and one side in the vehicle front-rear direction.
Figure 3:
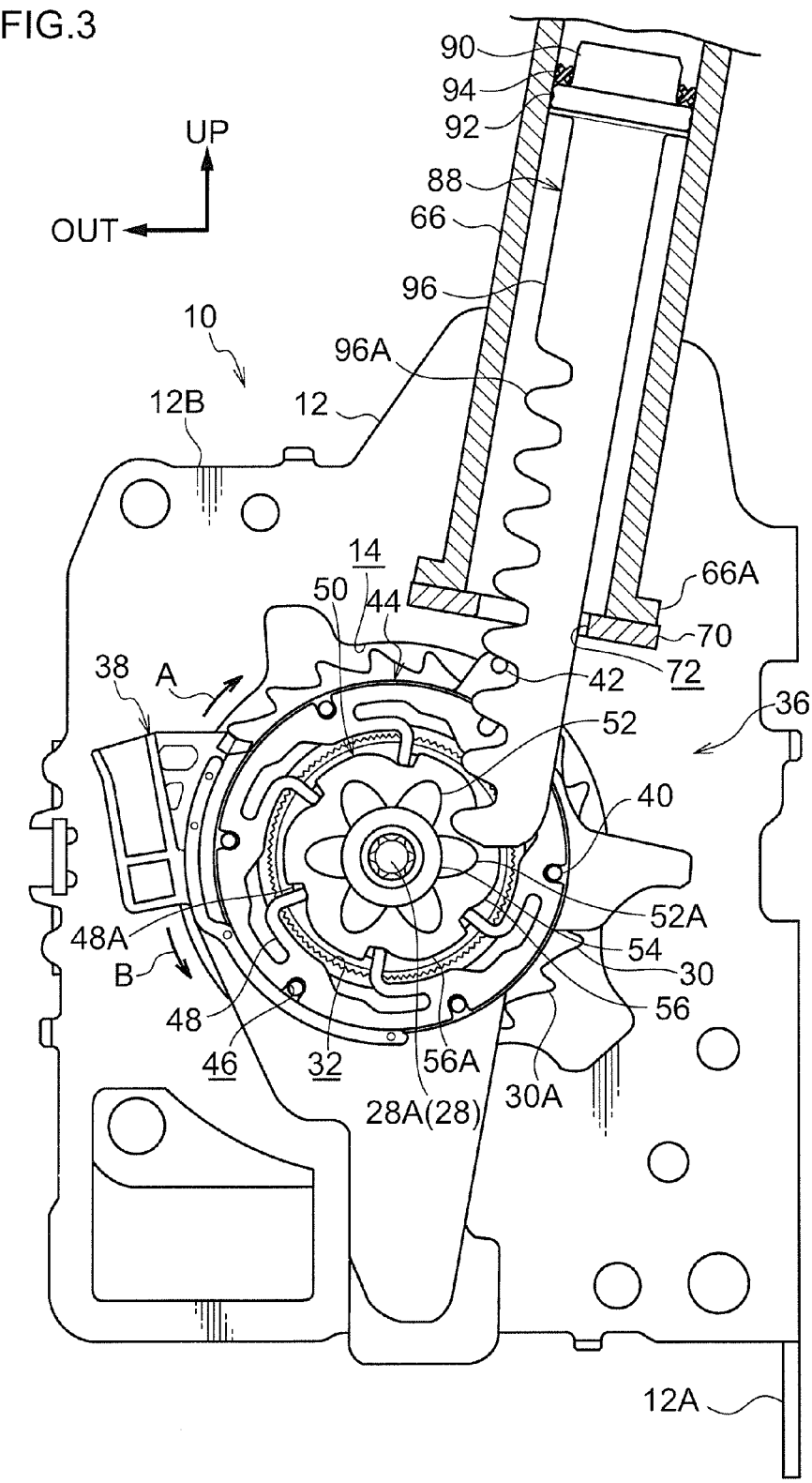
FIG. 3 is a side view from one side in the vehicle front-rear direction illustrating a webbing take-up device of a first exemplary embodiment of the present invention.

FIG. 2 is an exploded perspective view of a webbing take-up device 10 to which a pretensioner mechanism 36 according to a first exemplary embodiment of present invention is applied, as viewed from the vehicle width direction outside and one side in the vehicle front-rear direction. FIG. 3 is a side view illustrating the webbing take-up device 10 as viewed from the one side in the vehicle front-rear direction. In the drawings, the arrow OUT indicates the vehicle width direction outside, the arrow LO indicates one side in the vehicle front-rear direction, and the arrow UP indicates the upwards direction.

As shown in FIG. 2 and FIG. 3, the webbing take-up device 10 according to the first exemplary embodiment is provided with a frame 12 serving as a main body member and U-shaped in cross-section. The frame 12 includes a back plate 12A on the vehicle width direction inside, a leg plate 12B on one side in the vehicle front-rear direction, and a leg plate 12C on the other side in the vehicle front-rear direction. The webbing take-up device 10 is mounted to a vehicle with the frame 12 fixed to the vehicle by the back plate 12A.

The leg plate 12B and the leg plate 12C have a placement hole 14 and a placement hole 16 formed respectively through each other in circular shapes, with the placement hole 14 and the placement hole 16 facing each other. A rectangular shaped first engagement hole 18 is formed through the leg plate 12B above and on the back plate 12A side of the placement hole 14. The first engagement hole 18 is disposed substantially horizontal. A rectangular shaped second engagement hole 20 is formed through the leg plate 12B directly below the first engagement hole 18. The second engagement hole 20 is disposed parallel to the first engagement hole 18 and communicates with the first engagement hole 18.

A winding shaft 22 is rotatably supported between the leg plate 12B (the placement hole 14) and the leg plate 12C (the placement hole 16) of the frame 12.

A substantially circular cylindrical shaped spool 24 serving as a winding member is provided to the winding shaft 22. Long strip shaped webbing 26 (belt) is wound onto the spool 24 from the proximal end of the webbing 26. The webbing 26 extends out above the frame 12 and is capable of fitting across an occupant seated in a vehicle seat (not shown in the drawings). The webbing 26 is wound onto the spool 24 by rotation of the spool 24 in a take-up direction (the arrow A direction in FIG. 2 and FIG. 3), and the spool 24 is rotated in the pullout direction (the arrow B direction in FIG. 2 and FIG. 3) by the webbing 26 being pulled out from the spool 24.

A torsion shaft 28 is inserted coaxially inside the spool 24 and serves as an energy absorbing member configuring a force-limiter mechanism. A first end 28A of the torsion shaft 28 projects out from a first end face of the spool 24, on the leg plate 12B side. A second end 28B of the torsion shaft 28 is fixed so as to be incapable of relative rotation inside a second end of the spool 24, on the leg plate 12C side. The torsion shaft 28 is accordingly capable of rotation as one unit with the spool 24.

A substantially circular pillar shaped lock gear 30 is provided as a rotation member at the first end of the spool 24. The torsion shaft 28 passes through the lock gear 30 coaxially. The torsion shaft 28 is fixed to the lock gear 30 so as to be incapable of relative rotation. The lock gear 30 is accordingly capable of rotation as one unit with the torsion shaft 28. Ratchet teeth 30A (external teeth) are formed around the entire external circumference of the lock gear 30.

A circular pillar shaped ratchet recess 32 is formed configuring a ratchet mechanism in the face of the lock gear 30 opposite side of the spool 24 with the outer peripheral face of the ratchet recess 32 having a high coefficient of friction.

A biasing mechanism (not shown in the drawings) is provided as biasing means to the outside of the leg plate 12C of the frame 12. The biasing mechanism is coupled to the spool 24 and acts to impart biasing force to the spool 24 in the take-up direction.

A plate shaped lock plate 34 serving as a restriction member (lock member) is rotatably supported on the leg plate 12B of the frame 12 in the vicinity of the placement hole 14. Lock teeth 34A are formed to the lock plate 34. The lock plate 34 is coupled to a lock mechanism (not shown in the drawings) serving as restriction means (lock means). The lock plate 34 is rotated due to actuation of the lock mechanism when the webbing 26 is abruptly pulled out from the spool 24 and when rapid vehicle deceleration occurs, and the lock teeth 34A mesh (engage) with the ratchet teeth 30A of the lock gear 30. Rotation of the lock gear 30 in the pullout direction is thereby restricted (locked), thereby restricting rotation of the spool 24 in the pullout direction (while rotation of the spool 24 in the take-up direction is permitted).

The pretensioner mechanism 36 is provided as a rack and pinion on the outside of the leg plate 12B of the frame 12.

A substantially circular ring shaped gear case 38 made from a resin serves as a protection member provided to the pretensioner mechanism 36. The gear case 38 is fixed to the leg plate 12B. The external peripheral portion of the gear case 38 covers the external peripheral portion of the lock gear 30. The ratchet recess 32 of the lock gear 30 is disposed inside the gear case 38 and the first end 28A of the torsion shaft 28 passes through the gear case 38.

A specific number of circular pillar shaped retaining pins 40 (shear pins) are integrally formed at the external peripheral portion of the gear case 38. The retaining pins 40 project out from the gear case 38 away from the lock gear 30. A circular pillar shaped engaging pin 42 (shear pin) is integrally formed at an upper portion of the gear case 38. The engaging pin 42 projects out from the gear case 38 away from the leg plate 12B.

A substantially circular ring plate shaped clutch blade 44 is disposed as a clutch member configuring a clutch mechanism on the side of the gear case 38 away from the lock gear 30. The external peripheral edge of the clutch blade 44 is formed with a specific number of semi-circular mounting holes 46, with the specific number of mounting holes 46 disposed at even intervals around the circumferential direction of the clutch blade 44. The retaining pins 40 of the gear case 38 fit into the mounting holes 46 and the clutch blade 44 is thereby retained on the gear case 38.

A specific number (six in the present exemplary embodiment) of L-shaped plate extending portions 48 are integrally formed on the inner periphery of the clutch blade 44. The extending portions 48 are disposed at even intervals around the circumferential direction of the clutch blade 44. Pillar shaped teeth insertion portions 48A are integrally formed at the distal ends of the extending portions 48. The teeth insertion portions 48A project out from the extending portions 48 towards the gear case 38 and are inserted through the inside of the gear case 38 in the ratchet recess 32 of the lock gear 30. The teeth insertion portions 48A are separated from the outer peripheral face of the ratchet recess 32, and the clutch blade 44 permits rotation of the lock gear 30.

A pinion 50 is provided as a drive member on the inner peripheral side of the clutch blade 44. The first end 28A of the torsion shaft 28 passes coaxially through the pinion 50 and is capable of relative rotation with respect to the pinion 50. A cog wheel 52 is provided at an axial direction intermediate portion of the pinion 50. Pinion teeth 52A are formed around the entire circumference of the cog wheel 52. A circular pillar shaped support cylinder 54 is formed coaxially to the pinion 50 at a portion of the pinion 50 on the side away from the lock gear 30.

A clutch portion 56 for configuring a clutch mechanism is formed at a portion of the lock gear 30 side of the pinion 50. The clutch portion 56 is inserted into the ratchet recess 32 of the lock gear 30. A specific number (six in the present exemplary embodiment) of projections 56A are formed to the outer peripheral face of the clutch portion 56. The projections 56A are disposed at even intervals around the circumferential direction of the clutch portion 56 and each have projection heights that gradually increase in height on progression along the pullout direction. The teeth insertion portions 48A of the clutch blade 44 are mounted to (in press-contact with) the clutch portion 56 at portions of the respective projections 56A on the take-up direction side. The pinion 50 is accordingly retained to the clutch blade 44.

A metal plate shaped cover plate 58 is provided as an assembly member to the frame 12 on the outside of the leg plate 12B. The cover plate 58 is fixed (fastened) to the leg plate 12B by plural fixing screws 60. The cover plate 58 covers the gear case 38, the clutch blade 44 and the pinion 50 from the side away from the lock gear 30.

A support cylinder 54 of the pinion 50 passes through the cover plate 58 and the cover plate 58 rotatably supports the pinion 50. A K-ring 62 that is substantially C-shaped when viewed face-on is fitted over and fixed at the end of the support cylinder 54 away from the leg plate 12B. The pinion 50 is restrained from detaching from the cover plate 58 by the K-ring 62 engaging with the cover plate 58.

A rectangular shaped third engagement hole 64 is formed through an upper portion of the cover plate 58. The third engagement hole 64 is disposed substantially horizontal and faces towards the first engagement hole 18 and the second engagement hole 20 in the leg plate 12B.

A circular cylindrical shaped cylinder 66 is provided as a cylinder member between the leg plate 12B and the cover plate 58. The cylinder 66 is extends out upwards from the leg plate 12B and the cover plate 58.

Above the cover plate 58, the cylinder 66 fits inside a cylinder holder 68 of substantially U-shaped cross-section. The two length direction end portions of the cylinder holder 68 engage and are fixed to an upper portion of the leg plate 12B. The cylinder holder 68 restricts movement of the cylinder 66 in the radial direction and holds the cylinder 66.

A peripheral edge portion 66A is formed at the bottom end of the cylinder 66. The peripheral edge portion 66A projects out around the entire periphery of the cylinder 66. The peripheral edge portion 66A fits into the first engagement hole 18 in the leg plate 12B and the upper portion of the third engagement hole 64 in the cover plate 58.

A substantially rectangular shaped piston stopper 70 is disposed as a stopper member directly below the cylinder 66. The piston stopper 70 makes contact with the bottom end of the cylinder 66 (including the peripheral edge portion 66A) and fits into the second engagement hole 20 in the leg plate 12B and the lower portion of the third engagement hole 64 in the cover plate 58. Movement of the piston stopper 70 and movement of the cylinder 66 in the axial direction are thereby stopped, with the piston stopper 70 and the cylinder 66 fixed between the leg plate 12B and the cover plate 58.

A rectangular shaped through hole 72 is formed through the piston stopper 70 such that the inside of the cylinder 66 is open to the upper side of the pinion 50 through the through hole 72. A slight gap is formed at intermittently between the piston stopper 70 and the bottom end of the cylinder 66 (including the peripheral edge portion 66A), such that the inside of the cylinder 66 is in communication with the outside of the cylinder 66 through the gap.

A substantially circular pillar shaped gas generator 80 is fitted and fixed as drive means at the top end inside the cylinder 66. The gas generator 80 closes off the top end of the cylinder 66. The gas generator 80 is electrically connected to a vehicle control device (not shown in the drawings). By actuating the pretensioner mechanism 36 under control of the control device during a vehicle collision (at specific occasions such when a vehicle collision is detected or there is rapid vehicle deceleration) the gas generator 80 instantly generates high pressure gas and supplies the gas into the top end of the cylinder 66.

A piston 88 is provided as a movement member inside the cylinder 66 and is capable of moving along the axial direction of the cylinder 66.

A circular cylindrical shaped base 90 is provided at the top end of the piston 88, with the base 90 disposed substantially coaxial to the cylinder 66. A flange 92 is provided to the piston 88 directly below the base 90. The flange 92 is disposed coaxially to the base 90 and projects out around the entire outer periphery of the base 90. The flange 92 is slightly smaller in diameter than the inner peripheral face of the cylinder 66, such that the outer peripheral face of the flange 92 substantially fits against the inner peripheral face of the cylinder 66.

An X-ring 94 of circular ring shape and X-shaped cross-section is disposed as a seal member on the outer periphery of the base 90. The X-ring 94 is made from rubber and has resilience and sealing ability. When in a resiliently deformed state the X-ring 94 makes contact with the outer peripheral face of the base 90, the top face of the flange 92 and the inner peripheral face of the cylinder 66. The X-ring 94 accordingly seals between the cylinder 66 and the piston 88.

A substantially rectangular pillar shaped rack 96 is provided to the piston 88 below the flange 92. Rack teeth 96A are formed to portions of the rack 96 on the side facing away from the back plate 12A. The rack 96 projects out from the bottom end of the cylinder 66 and passes through the through hole 72 in the piston stopper 70. The bottom end of the rack 96 is disposed in the vicinity of the top side of the cog wheel 52 of the pinion 50, with the rack teeth 96A engaged with the engaging pin 42 of the gear case 38.

Figure 5A:
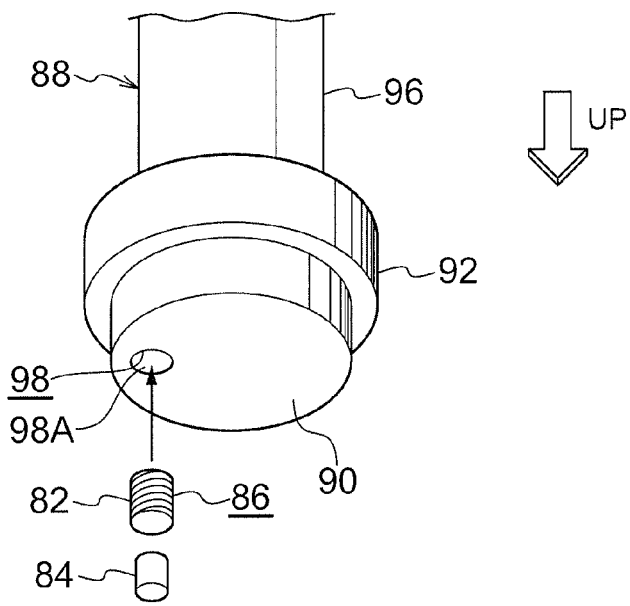
FIG. 5A and FIG. 5B are diagrams illustrating relevant portions of a piston in a pretensioner mechanism according to the first exemplary embodiment of the present invention.
Figure 5B:
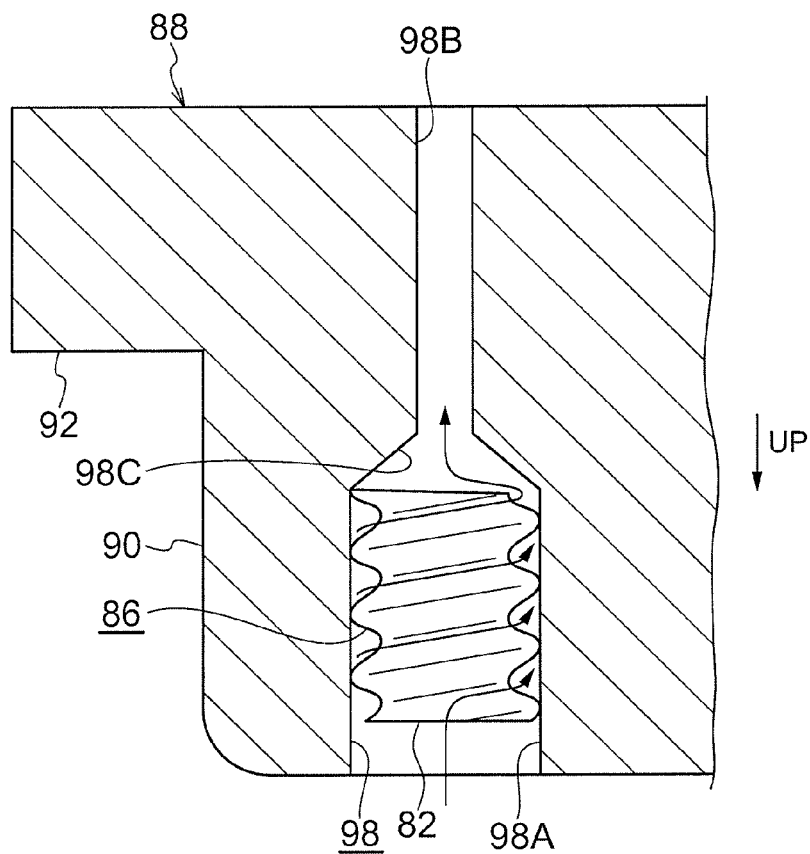

As shown in FIG. 5A and FIG. 5B, a circular shaped through hole 98 (gas release hole) is formed through the base 90 and the flange 92 of the piston 88. The axial direction of the through hole 98 is parallel to the movement direction of the piston 88 (the axial direction of the cylinder 66), and communicates above (a second side) with below (a first side) of the base 90 and the flange 92 of the piston 88.

A circular shaped large diameter portion 98A is formed at a portion at the top end of the through hole 98, and a circular shaped small diameter portion 98B is formed at a portion at the bottom end of the through hole 98. The diameter of the large diameter portion 98A is larger than that of the small diameter portion 98B. A circular truncated cone shaped tapered portion 98C is formed between the large diameter portion 98A and the small diameter portion 98B of the through hole 98. The diameter of the tapered portion 98C gradually decreases on progression from the large diameter portion 98A side towards the small diameter portion 98B side.

The whole of a substantially circular pillar shaped closure member 82 is press inserted (inserted) by a coaxial press insertion pin 84 serving as press insertion means from the top side of the closure member 82 into the through hole 98. The closure member 82 makes contact with the tapered portion 98C of the through hole 98 and is configured so as not to fall out from the through hole 98. The through hole 98 is accordingly closed off by the closure member 82.

The closure member 82 is configured as a set screw with a thread groove 86 formed as a communication groove on the peripheral face. The thread groove 86 is a heliacal shape running at an inclination to the axial direction of the closure member 82 (the axial direction of the through hole 98) and communicates between above and below the closure member 82. The cross-sectional area of the thread groove 86 is made as small as possible within a range that can be formed on the peripheral face of the closure member 82, to form a smaller cross-section surface area that is achievable with respect to the smallest through hole formable in the piston 88. The depth of the thread groove 86 is, for example, 0.2 mm or less (preferably 0.1 mm or less).

Explanation follows regarding operation of the first exemplary embodiment.

With the webbing take-up device 10 configured as described above, when an occupant seated on a vehicle seat has fitted the webbing 26 around him/herself slack in the webbing 26 is removed by action of biasing force of the biasing mechanism acting on the spool 24 in the take-up direction.

By actuation of the lock mechanism during a vehicle collision when the webbing 26 is abruptly pulled out from the spool 24 and/or there is rapid vehicle deceleration, the lock teeth 34A of the lock plate 34 are meshed with the ratchet teeth 30A of the lock gear 30. Rotation of the lock gear 30 in the pullout direction is thereby restricted, and by restricting rotation of the spool 24 in the pullout direction, the webbing 26 is restricted from being pulled out from the spool 24, with the webbing 26 restraining the occupant.

By actuation of the pretensioner mechanism 36 under control of the control device during a vehicle collision, the gas generator 80 instantly generates high pressure gas and supplies the gas into the top end of the cylinder 66. The piston 88 (the base 90 and the flange 92) and the X-ring 94 accordingly are imparted with a pressing force from above while a sealed state is maintained by the X-ring 94 between the cylinder 66 and the piston 88. The engaging pin 42 of the gear case 38 engaged with the rack 96 (the rack teeth 96A) of the piston 88 is sheared by the rack teeth 96A, and the piston 88 and the X-ring 94 move downwards. The rack 96 (the rack teeth 96A) of the piston 88 are meshed with the cog wheel 52 (the pinion teeth 52A) of the pinion 50 and so the pinion 50 is rotated in the take-up direction.

When the pinion 50 is rotated in the take-up direction, the teeth insertion portions 48A of the clutch blade 44 move relatively along the clutch portion 56 of the pinion 50 from the take-up direction side portions of the projections 56A to the pullout direction side portions of the projections 56A. The teeth insertion portions 48A are accordingly moved towards the outer peripheral face side of the ratchet recess 32 of the lock gear 30 while the extending portions 48 of the clutch blade 44 deform and move towards the outer peripheral side of the clutch blade 44. The teeth insertion portions 48A are meshed (engaged) between the clutch portion 56 (the peripheral face of the projections 56A) and the lock gear 30 (the outer peripheral face of the ratchet recess 32), enabling the pinion 50, the clutch blade 44, the lock gear 30, the torsion shaft 28 and the spool 24 to be rotated as a single body. The retaining pins 40 of the gear case 38 fitted into the mounting holes 46 of the clutch blade 44 are accordingly sheared by the peripheral edges of the mounting holes 46. By thereby releasing retention of the clutch blade 44 to the gear case 38, the pinion 50, the clutch blade 44, the lock gear 30, the torsion shaft 28 and the spool 24 are rotated as a single body in the take-up direction. The webbing 26 is accordingly taken up on the spool 24, increasing the restraining force of the webbing 26 on the occupant.

As shown in FIG. 4, downward movement of the piston 88 and the X-ring 94 stops when the flange 92 of the piston 88 contacts the piston stopper 70, thereby completing actuation of the pretensioner mechanism 36. When this occurs a gap is formed at a portion between the flange 92 and the piston stopper 70 while the sealed state between the cylinder 66 and the piston 88 is maintained by the X-ring 94.

However, the through hole 98 of the piston 88 is closed off by the closure member 82 press inserted into the through hole 98, with the thread groove 86 on the peripheral face of the closure member 82 communicating between above and below the closure member 82.

The closure member 82 is press inserted into the through hole 98 and the thread groove 86 is formed in the peripheral face of the closure member 82 to communicate between above and below the closure member 82. The length of the thread groove 86 can accordingly be lengthened by forming the thread groove 86 as a heliacal shape disposed at an angle to the axial direction of the closure member 82. The cross-sectional area of the thread groove 86 is also made small.

Figure 1A:
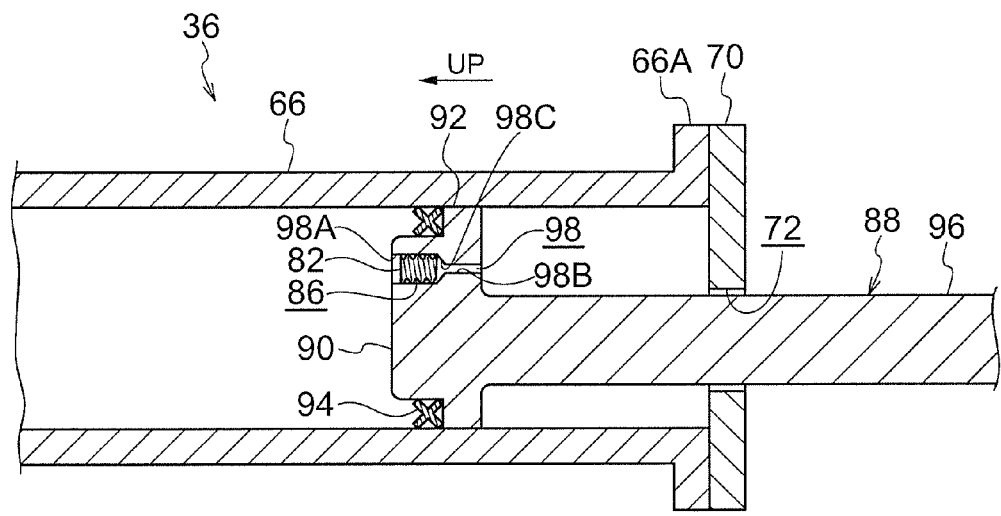
FIG. 1A and FIG. 1B are cross-sections illustrating relevant portions of a pretensioner mechanism according to a first exemplary embodiment of the present invention.

Accordingly, as shown in FIG. 1A, when the pretensioner mechanism 36 is actuated and the piston 88 and the X-ring 94 are moving downward, gas in the cylinder 66 above the piston 88 (the flange 92) can be suppressed from being discharged below the piston 88 (the flange 92) through the thread groove 86, a reduction in downward movement force of the piston 88 can be suppressed, and the restraining force of the webbing 26 on the occupant can be increased.

Figure 1B:
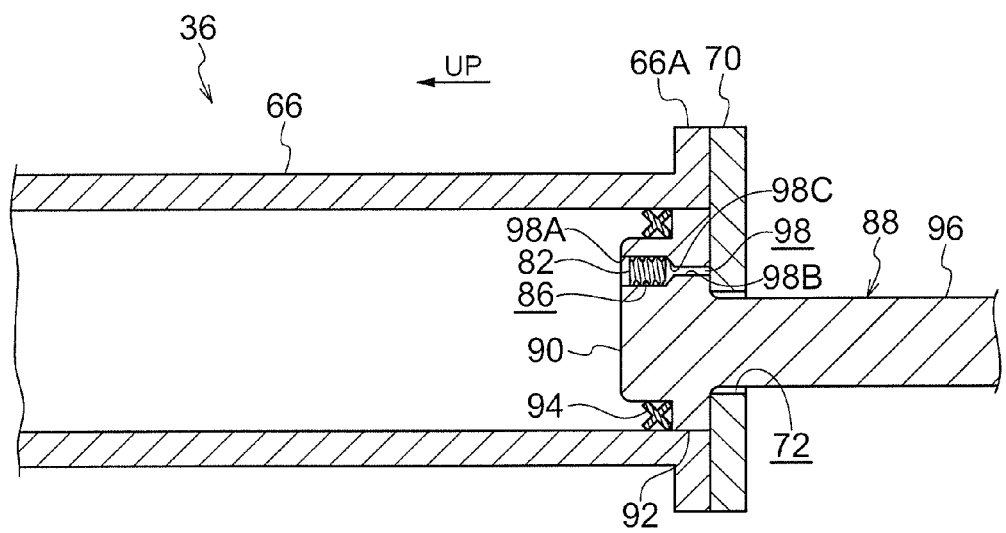

Then, as shown in FIG. 1B, after actuation of the pretensioner mechanism 36 is completed (after downward movement of the piston 88 and the X-ring 94 has stopped), the gas in the cylinder 66 above the piston 88 (the flange 92) is gently released through the thread groove 86 below the piston 88 (the flange 92). As a result the gas in the cylinder 66 is released below the piston 88 (the flange 92) while the heat of the gas at the periphery of the thread groove 86 is gradually absorbed by the piston 88 and the closure member 82 over a lengthened period of time. The gas in the piston 88 (the flange 92) can accordingly be discharged in a cooled state to outside of the cylinder 66 from the through hole 72 in the piston stopper 70 through the gap between the flange 92 and the piston stopper 70, and through the gap between the piston stopper 70 and the bottom end of the cylinder 66 (including the peripheral edge portion 66A).

Consequently, easy operation when dismantling the cylinder 66 and the piston 88 is facilitated in a state in which the gas in the cylinder 66 has been discharged without intervention.

The closure member 82 is a set screw, with the entire body of the closure member 82 press inserted into the through hole 98 in the piston 88. The closure member 82 can thereby be prevented from completely blocking off the through hole 98.

Second Exemplary Embodiment

Figure 6A:
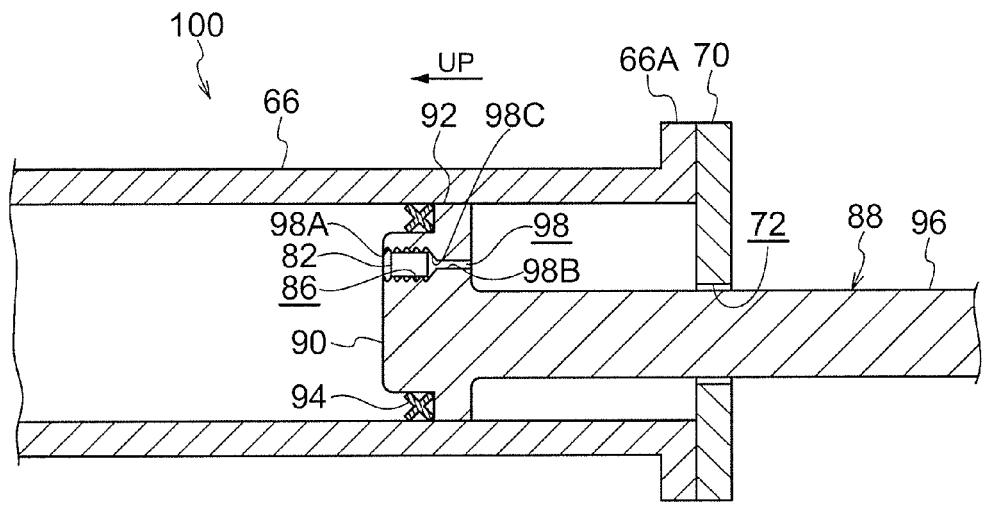
FIG. 6A and FIG. 6B are cross-sections illustrating relevant portions of a pretensioner mechanism according to a second exemplary embodiment of the present invention.
Figure 6B:
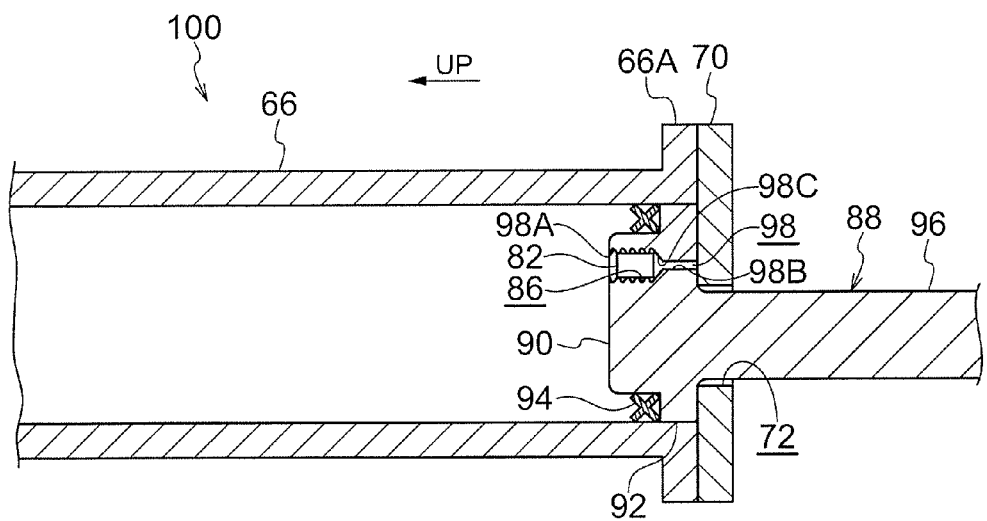

A cross-section of relevant portions of a pretensioner mechanism 100 according to a second exemplary embodiment of the present invention is illustrated in FIG. 6A and FIG. 6B.

The pretensioner mechanism 100 according to the second exemplary embodiment is substantially the same as that of the above first exemplary embodiment, however there are the following points of difference.

The pretensioner mechanism 100 is configured with a thread groove 86 in the peripheral face of the large diameter portion 98A of the through hole 98 instead of the thread groove 86 formed in the peripheral face of the closure member 82. The thread groove 86 is formed in a helical shape so as to run at an inclination to the axial direction of the through hole 98 (the axial direction of the closure member 82) and to communicate between above and below the closure member 82. The cross-sectional area of the thread groove 86 is made as small as possible within a range enabling formation in the peripheral face of the through hole 98, and is smaller than the cross-section surface area of the smallest through hole formable in the piston 88. The depth of the thread groove 86 is, for example, 0.2 mm or less (preferably 0.1 mm or less).

The second exemplary embodiment can also exhibit the similar operation and effect as that of the above first exemplary embodiment.

Each of the above exemplary embodiments is a configuration in which the thread groove 86 is formed in either the peripheral face of the closure member 82 or in the peripheral face of the through hole 98, however configuration may be made with the thread groove 86 formed in both the peripheral face of the closure member 82 and the peripheral face of the through hole 98. In such cases the pitch (ratio of separation between grooves in the axial direction of the respective thread grooves 86) between the thread groove 86 on the peripheral face of the closure member 82 and the thread groove 86 on the peripheral face of the through hole 98 may be set the same as each other at 1:1, or set different from each other, such as at 2:1 or 1:2.

While each of the above exemplary embodiments is a configuration in which the thread groove 86 is helical in shape, so as to run along at an inclination to the axial direction of the closure member 82 and the through hole 98, the thread groove 86 may be configured so as to run parallel to the axial direction of the closure member 82 and the through hole 98.

Furthermore, while each of the above exemplary embodiments is configured with the closure member 82 press inserted into the through hole 98 by the press insertion pin 84, configuration may be made such that the closure member 82 is inserted into the through hole 98 without employing the press insertion pin 84.

For example, a tool slot may be formed on the top face of the closure member 82 (for example a plus-shape or minus-shape when viewed face on), and the closure member 82 inserted (press inserted) into the through hole 98 by fitting a tool (for example a screwdriver) into the tool slot and rotating the closure member 82 together with the tool.

In each of the above exemplary embodiments configuration is made such that the spool 24 is wound with the webbing 26 by moving the piston 88 (the movement member) inside the cylinder 66 (the cylinder member), however configuration may be made such that the spool 24 is wound with the webbing 26 by moving a ball (movement member) inside a pipe (cylinder member).

Each of the above exemplary embodiments is an example of application of the present invention to the webbing take-up device 10, however configuration may be made with the present invention applied to a movement device that moves the support section of the webbing 26.

What is claimed is:

1. A pretensioner mechanism comprising:
    webbing capable of restraining a vehicle occupant;
    a cylinder member into which gas is supplied when specific conditions occur;
    a movement member provided so as to be capable of moving inside the cylinder member, the movement member being formed with a communication hole that communicates a first side and a second side of the movement member;
    a closure member that is inserted into the communication hole and substantially closes off the communication hole to such an extent that pressure from the gas supplied into the cylinder member causes the movement member to move towards the first side and the restraining force of the webbing on the occupant is increased; and
    a communication groove formed between an inner surface of the communication hole and an outer surface of the closure member to communicate a first side of the closure member with a second side of the closure member.

2. The pretensioner mechanism of claim 1, wherein the communication groove is formed in a helical shape.

3. The pretensioner mechanism of claim 2, wherein the closure member is a set screw.

\* \* \* \* \*